United States Patent [19]

Yamaguchi et al.

[11] Patent Number: 4,489,410
[45] Date of Patent: Dec. 18, 1984

[54] APPARATUS FOR INSTALLING A DISK

[75] Inventors: Ryoji Yamaguchi, Tokyo; Yoshiaki Tago, Yokohama, both of Japan

[73] Assignee: Tokyo Shibaura Denki Kabushiki Kaisha, Japan

[21] Appl. No.: 373,787

[22] Filed: Apr. 30, 1982

[30] Foreign Application Priority Data

May 1, 1981 [JP] Japan .................................. 56-66470

[51] Int. Cl.[3] .......................... G11B 3/62; G11B 17/00
[52] U.S. Cl. ..................................... 369/270; 369/292
[58] Field of Search ......................... 369/270, 271, 292

[56] References Cited

U.S. PATENT DOCUMENTS 3,609,722  9/1971  Zenzefilis .
4,340,955  7/1982  Elliott ................................ 369/270

FOREIGN PATENT DOCUMENTS 583886   4/1925  France ................................. 369/270
2388366  11/1978 France .

Primary Examiner—Steven L. Stephan
Attorney, Agent, or Firm—Cushman, Darby & Cushman

[57] ABSTRACT

An apparatus for installing a disk having a through hole formed in the center thereof, which comprises a rotatable shaft, a disk support which is fixed to the rotatable shaft and has a supporting surface for supporting the one side of the disk, and a disk holder which is detachably fitted to the rotatable shaft and presses the disk on its other side toward the supporting surface, thereby to cause the disk to be fixed between the disk holder and the disk support. The disk holder includes a holder body which is provided to be fitted onto the rotatable shaft and movable along the rotatable shaft, a pressure assembly which is disposed on the holder body to exert the disk on its other side an elastic pressure against the supporting surface, and a slip preventive mechanism for preventing the holder body from the rotatable shaft by engaging the holder body with the rotatable shaft through the fitting of the holder body onto the rotatable shaft.

6 Claims, 4 Drawing Figures

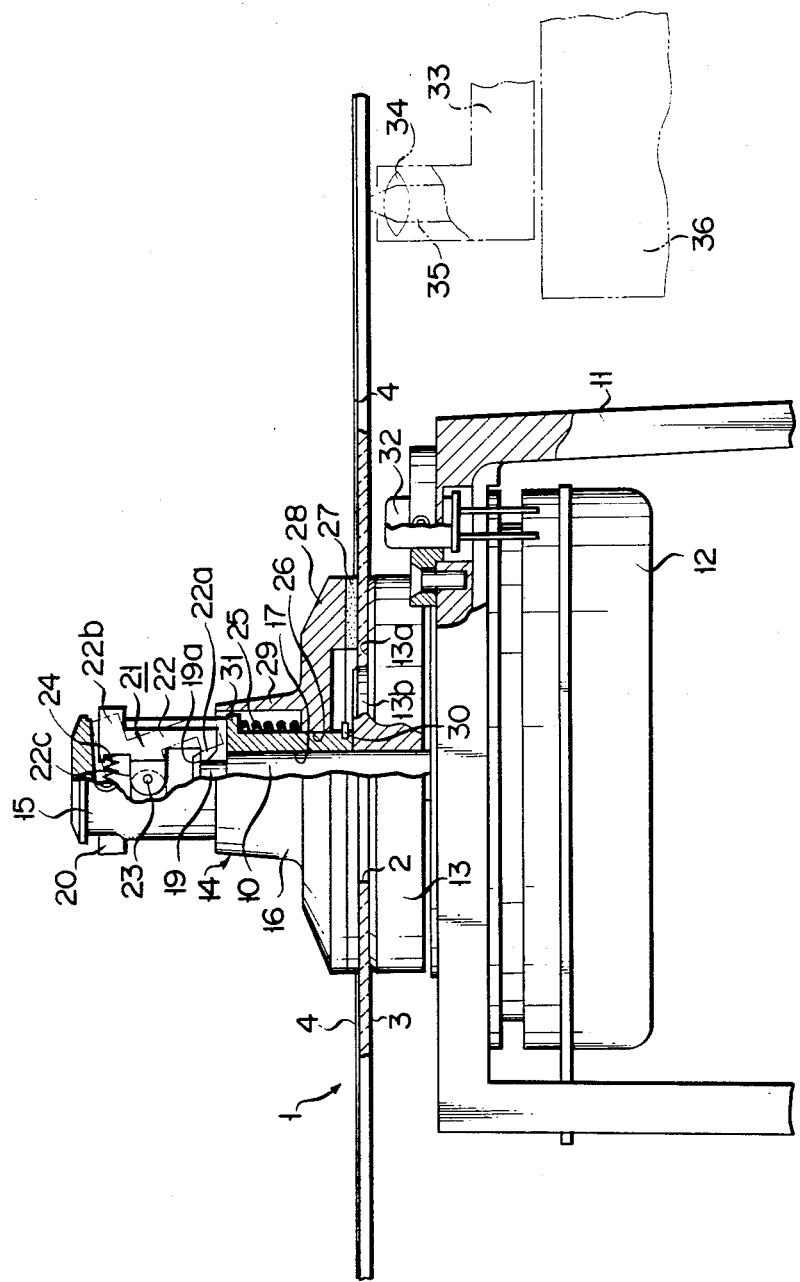

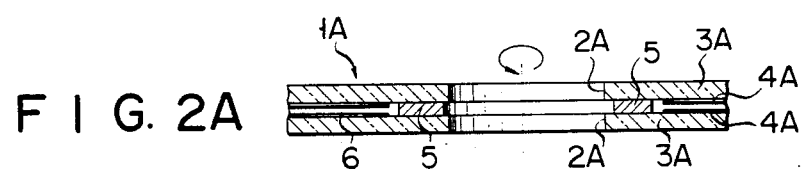
F I G. 2A
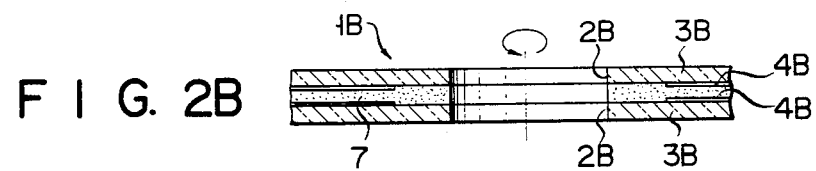
F I G. 2B
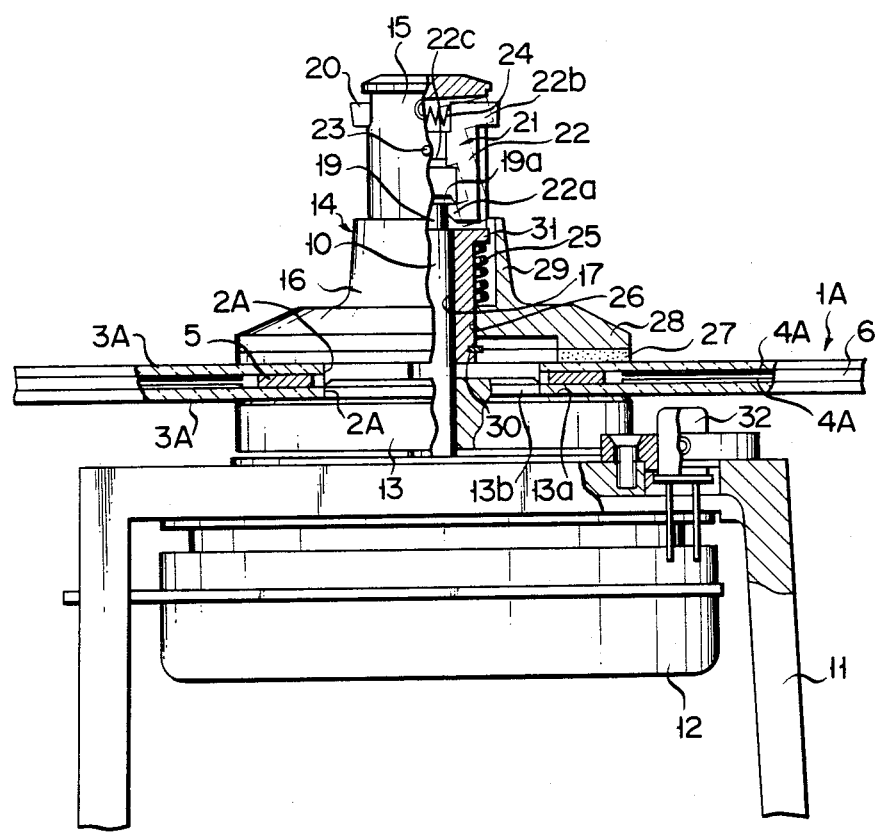
F I G. 3

APPARATUS FOR INSTALLING A DISK

BACKGROUND OF THE INVENTION

This invention relates to an apparatus for installing a disk, and more particularly to an apparatus for detachably installing a disk rotatively driven by a motor to a disk holder.

Recent information processing systems including, for example, an optical disk memory have various merits such a recording density several ten to hundred times greater than that of a magnetic memory; capability of making high speed random access to; excellent long-period stock property; a ready recording system; capability of additional recording and inexpensive cost per bit. Thus, this kind of optical information processing system finds extensive applications as recording/reproducing system or as exclusive reproducing system. The exclusive reproducing type optical information processing system finds applications in home video disks, business video disks, audio PCM disks, etc. The recording/reproducing type optical information processing system finds applications in document files, video files, general computer memories, etc.

Heretofore, in an optical information processing system like this, the apparatus for installing a disk to be rotatively driven comprises a disk support (turntable) fixed to a driving shaft and supporting the disk at the center of its one side and a pressure member which is screwed on the thread provided on the distal end of the driving shaft and presses down on the disk at the center of its other side. The driving shaft is fitted into the through hole which is formed in the center of the disk for the disk positioning purpose, thereby to restrict the radial movement of the disk. The movement of the disk in the longitudinal direction of the driving shaft is restricted by holding the disk between the disk holder and the disk pressure member. However, in order to install or remove the disk, it is necessary for the pressure member to screwed onto the driving shaft or to be loosened. This operation is very troublesome. Moreover, the tightness tends to vary according to the operator using this particular apparatus. Accordingly, the excessive tightness would result in the deformation of the disk or insufficient tightness would cause the disk to become loosened during operation. As stated above, the disk installing apparatus previously in use often exerted adverse effects upon the information processing operation.

SUMMARY OF THE INVENTION

This invention has been made in view of the above-mentioned conditions, the object of the invention is to provide an apparatus for installing a disk, which makes it easier to install and remove the disk and to hold the disk steadily with a constant force.

According to an aspect of the present invention, there is provided an apparatus for installing a disk having a through hole formed in the center thereof, which comprises a rotatable shaft, a disk support which is fixed to the rotatable shaft and has a supporting surface for supporting the one side of the disk, and a disk holder which is detachably fitted to the rotatable shaft and presses the disk on its other side toward the supporting surface, thereby to cause the disk to be fixed between the disk holder and the disk support, the disk holder including a holder body which is provided to be fitted onto the rotatable shaft and movable along the rotatable shaft, a pressure means which is disposed on the holder body to exert the disk on its other side an elastic pressure against the supporting surface, and a slip preventive means for preventing the holder body from the rotatable shaft by engaging the holder body with the rotatable shaft through the fitting of the holder body onto the rotatable shaft.

BRIEF DESCRIPTION OF THE DRAWINGS

FIG. 1 is a partially sectional side view of one embodiment of a disk installing apparatus according to the present invention;

FIGS. 2A and 2B are respectively sectional views showing a disk which has been installed by means of the disk installing apparatus according to the present invention; and FIG. 3 is a partially sectional side view of other embodiment of a disk installing apparatus according to the present inventon.

DETAILED DESCRIPTION OF THE PREFERRED EMBODIMENTS

The preferred one embodiment of the present invention, when applied to an optical information processing system, is hereinafter described in detail with reference to FIG. 1.

In FIG. 1, reference numeral 10 represents a rotatable shaft which is provided along a vertical direction. This rotatable shaft 10 is coaxially and integrally coupled to the driving shaft of a driving motor 12 which is mounted on a bed 11 provided thereunder. A thick, disk-shaped disk support 13 is fixed to the lower end (driving motor side) of the rotatable shaft 10. The disk support 13 includes a disk supporting surface 13a on the upper surface thereof which is flat and perpendicular to the axis of the rotatable shaft 10 and a circular-shaped positioning protrusion 13b, which is coaxial with the axis of the rotatable shaft 10, in the center of the disk supporting face 13a. This positioning protrusion 13b is so formed as to fit closely into a positioning through hole 2 provided in the center of a disc 1. The positioning protrusion 13b restricts the movement of the disk 1 in the radial direction while the disk supporting face 13a restricts the movement of the disk 1 in the axial direction. That portion of the positioning protrusion 13b which fits into the positioning hole 2 is made nearly as thick as the disk 1.

The upper end of the rotatable shaft 10 is so designed that a disk holder 14 can be detachably fitted to the shaft along its axis. The disk holder 14 presses on the disk 1 which is supported by the disk support 13 so that the disk 1 may be restricted in its upward movement along the axis of the shaft and also in its rotating motion.

The disk holder 14 comprises a holder body 15 which is detachably fitted to the rotatable shaft 10 in the axial direction and the pressure assembly 16 which separately provided around the outer periphery of the holder body 15. The holder body 15 has a guide hole 17 in the center thereof which extends from the lower surface up to around the middle. Into this guide hole 17 is inserted the rotatable shaft 10 so that the holder body 15 is slidably fitted to the rotatable shaft 10. On the distal end of the rotatable shaft 10 is formed an annular engaging groove 19. The periphery of a flange 19a which defines the upper edge of the groove 19 is tapered.

In the top of the holder body 15 is provided a slip preventive device 21 to prevent the holder body 15 from slipping off the rotatable shaft 10. The slip preventive device 21 has a pair of engaging levers 22 which extend vertically and fitted to the holder body 15 to rock freely. Each engaging lever 22 has at its lower end an engaging portion 22a which is enabled to engage with the engaging groove 19 and at its upper end a protrusion 22b which protrudes outwardly from the holder body 15 in the radial direction. In the middle of each engaging lever 22 is provided the supporting portion 22c protruding inwardly in the radial direction. Both engaging levers 22 are supported rotatably at the supporting portions 22c through a common pin 23. The upper ends of the engaging levers 22 are forced outward in opposite directions by means of a common compression spring 24 and both protrusions 22b protrude outward from the holder body 15. With both protrusions 22b protruding outwardly owing to the force caused by the compression spring 24, the engaging portion 22a of each engaging lever is engaged with the engaging groove 19 formed on the rotatable shaft 10, that is to say, the holder body 15 is fixed to the rotatable shaft 10. When both protrusions 22b are forced inward against the force caused by the compression spring 24 (as indicated by the two-dot and dash line in FIG. 1), the engaging portion 22a of each engaging lever 22 is disengaged from the engaging groove 19, that is to say, the holder body 15 become removable from the rotatable shaft 10.

That part of the engaging portion 22a of each engaging lever 22 which engages with the flange 19a of the rotatable shaft 10 is tapered. Therefore, if the holder body 15 is pushed in so that the rotatable shaft 10 inserts into the guide hole 17, the tapered surface of the engaging portion 22a of the engaging lever 22 comes into contact with the tapered surface of the flange 19a of the rotatable shaft 10. If the holder body 15 is further pushed in, each engaging lever 22 rocks against the force of the compression spring 24 through the engagement of two tapered surfaces. As a result, each engaging portion 22a moves over the flange 19a to fall into and engage with the groove 19. The force of the compression spring 24 will keep the groove 19 and engaging portion 22a in the engaged state.

The pressure assembly 16 is externally fitted to the holder body 15 to be free to slide in the axial direction of the rotatable shaft 10 and is urged toward the disk support 13 at all times by means of the compression spring 25. That is to say that the pressure assembly 16 includes a disk-shaped pressure body 28 having a guide hole 26 in the center thereof into which the peripheral edge of the holder body 15 is slidably fitted. The pressure body 28 is so formed at the outer diameter thereof is substantially equal to the outer diameter of the disk support 13. The pressure assembly further includes a cylindrical portion 29 integral with the pressure body 28 from which the holder body 15 protrudes upward nearly to the middle part thereof. To the peripheral edge of the lower surface of the pressure body 28 is fitted a ring-shaped pad 27 which is made of rubber, for example. Thus the pressure assembly 16 thus constructed is externally fitted to the lower end of the holder body 15 and is prevented from slipping from the holder body 15 by means of a snap ring 30 which is provided on the lower end of the holder body 15.

A flanged-shaped step 31 for bearing the top end of the spring 25 is formed protruding outwardly roughly in the middle portion along the axis on the outer periphery of the holder body 15. The outer periphery of the holder body 15 is wound with several turns of the compression spring 25 one end of which is engaging with the step 31 and the other end of which is engaging with that portion of the pressure body 28 which is a periphery of the guide hole 26. The compression spring 25 urges the pressure assembly 16 downward along the rotatable shaft 10. This pressure assembly 16, when no external force is exerted thereto, is held in contact with the snap ring 30 by the urging force of the spring 25.

The disk 1 is provided with a transparent disk-shaped base plate 3 and an information forming layer 4 including a recording layer or an optical reflected layer which is formed on one surface of the base plate 3. In the center of the base plate 3 is formed the previously mentioned through hole 2. The disk 1 thus constructed is set to the disk installing apparatus, the information forming layer 4 side up.

The bed 11 is provided with a detector 32 for detecting whether the disk 1 is installed or not. Beneath of disk 1 properly set in place is located an optical head 33. The optical head 33 has an object lens 34 so that a laser beam 35 is projected from below onto the information forming layer 4 through the object lens 34.

The optical head 33 is so designed that it is moved in the radial direction of the disk 1 by means of a head driving mechanism 36. No detailed explanations will be made herein about the disk 1, optical head 33 and head driving mechanism 36 because they are of known construction, respectively.

The operation of the disk installing apparatus which is to constructed as described above will be described hereinafter.

First, with the information forming layer 4 of the disk 1 facing upward, the positioning hole 2 of the disk 1 is to be loosely fitted onto the rotatable shaft 10. Thereafter, the positioning hole 2 is closely fitted onto the positioning protrusion 13b of the disk support 13 while the disk supporting surface 13a of the disk support 13 is caused to support the disk 7 at the center portion of its underside. Next, the guide hole 17 which is formed in the holder body 15 of the disk holder 14 is caused to face the upper end of the rotatable shaft 10 and the holder body 15 is pushed onto the rotatable shaft 10 in such a manner that the rotatable shaft 10 is inserted into the guide hole 17. Then, the ring-shaped pad 27 which is fitted to the underside of the pressure body 28 comes into contact with the center of the upper face of the disk 7 with the result that the downward movement of the pressure assembly 16 is restricted. While the holder body 15 is further pushed, the compression spring 25 is further compressed against its recoiling force and as a result only the holder body 15 comes down. With the downward movement of the holder body 15, the tapered surfaces of the engaging portions 22a of both engaging levers 22 come into contact with the flanged portion 19a of the rotatable shaft 10 and the engaging levers 22 are caused to rock against the recoiling force of the spring 24. Thus, the engaging portions 22a of both engaging levers 22 become engaged with the engaging groove 19 on the rotatable shaft 10 so that the holder body 15 is fixed to the rotatable shaft 10. At this time the pressure assembly 16 which has been externally fitted to the holder body 15 is pushed downward by means of the recoiling force of the compression spring 25 so that the disk 1 is pressed toward the disk support 13 by the descending pressure assembly 16. As a result, the disk 1 is held between the disk supporting surface 13a of the disk support 13 and the pressure assembly 16 of the disk holder 14 so that the disk 1 is restricted in its vertical and rotative movements. The radial movement of the disk 1 will also be restricted by the positioning protrusion 13b of the disk support 13.

As described above, the disk 1 can be fixed in place simply by setting the disk 1 on the disk support 13 and then pushing the disk holder 14 onto the rotatable shaft 10. Furthermore, the pressing force exerted by the pressure assembly 16 is set constantly at an appropriate value by means of the compression spring 25 at all times irrespective of the operator, thus eliminating the possibility of the disk being damaged or moving out of the fixed position.

To remove the disk 1, it is only necessary to press both protrusions 22b of the slip preventive mechanism 21 against the force of the compression spring 24 and rock both engaging levers 22 as indicated by the two-dot and dash line in FIG. 1. As a result of this operation, the engaging portion 22a is disengaged from the engaging groove 19 of the rotatable shaft 10 and consequently the holder body 15 rises automatically by dint of the recoiling force of the compression spring 25 to unfasten the disk 1, that is to say, the holder body 15 is now ready to be pulled out simply by pressing both protrusions 22b. The disk 1 can be removed after pulling the disk holder 14 out from the rotatable shaft 10.

The disk 1 of such construction is caused to rotate with the rotation of the rotatable shaft 10. The laser beam 9 which has been focused through the lens 8 is projected from beneath the disk 1 to cause such changes of the condition as the formation of pits on the information forming layer 4 according to the information. The information is recorded on the disk 1 in this way. On the other hand, the reflected laser beam from the information forming layer 4 is output after photoelectric conversion to enable the reproduction of the information which has been recorded in the form of pits on the information forming layer 4.

The present invention is not limited to the aforementioned one embodiment but is capable of various changes and modifications within the limits not excessively departing from the spirits of the invention. Another embodiment of the present invention will be described hereinafter. In the following explanations, the similar parts with those of the previously described one embodiment will be given the same symbols or numerals with explanations of them being omitted.

In the previously described one embodiment, the disk 1 is supposed to have a single transparent disk-shaped base plate 3. However, the disk 1 which can be treated by the disk installing apparatus is not limited to such construction. As for the optical disk as an information storage medium for use in the optical information processing system, there has been developed such a disk that information processing is possible from both sides of the disk, for instance. With regard to this type of disk, there are disks of such basic construction as illustrated in FIG. 2A or 2B. The disk 1A which is shown in FIG. 2A has two disk-shaped transparent base plates 3A which are fixed in coaxial and parallel relation and spaced by means of the outer spacer which is not shown in the drawing and the inner spacer 5. Each of transparent base plate 3A has positioning through hole 2A in the center thereof. Both through holes 2A are disposed in coaxial relation to each other. Two information forming layers 4A are provided on the underside of the upper transparent base plate 3A and the upper side of the lower transparent base plate 3A, respectively. The disk 1A has an empty space 6 between the two transparent base plates 3A except for the inner spacer 5.

The disk 1B which is illustrated in FIG. 2B has no inner spacer 5 and has an adhesive layer 7 instead of the empty space, that is to say, the two transparent base plates 3B are stuck to each other through the adhesive layer 7.

When two transparent base plates 3A (3B) are stuck to each other, the positioning holes 2A (2B) of the two base plates 3A (3B) would not necessarily be exactly aligned with each other due to the errors of assembly during manufacture, that is to say, the two transparent base plates 3A (3B) could be fastened in such positions as that they are slightly deviated from each other. Therefore, in the conventional disk installing apparatus in which the positioning of the disk 7 in the radial direction is done by inserting the driving shaft into the positioning hole 2A (2B) of the transparent base plate 3A (3B), it sometimes happened that the disk could not be inserted properly due to the deviations of the center positions of the positioning holes 2A (2B) of the two base plates 3A (3B).

However, in the disk installing apparatus according to the present invention as illustrated as another embodiment of the invention in FIG. 3, that part of the positioning protrusion 13b which comes into contact with the positioning through hole 2A is roughly equal in thickness with one transparent base plate 3A and therefore the position protrusion 13b of the disk support 13 will only be fitted into the positioning through hole 2A of the lower base plate 3A of the disk 1A. Thus, even when the positioning through holes 2A (2B) of the upper and lower base plates 3A (3B) are not exactly aligned with each other, it will not interfere with the installation of the disk. Moreover, the lower base plate 3A (3B) on which information processing takes place is caused to rotate without any deviation from the center, thus assuring the accurate follow-up movement of the optical head 33 to enable accurate and stable information processing operations. This is also the same in the case where the disk 1A (1B) is installed in the case of putting upside down.

It is needless to say that the disk installing apparatus embodying the present invention is applicable not only to optical information processing systems but also to audio equipment.

The shape of the positioning protrusion 13b of the disk support 13 is not restricted to the disk-like shape. It may be made up with a plurality of pin-like protrusions which will come into contact with the inside wall of the through hole 2 of the disk 1. What is essential for the positioning protrusion 13b is that it is so shaped as to ensure the alignment of the center of the through hole 2 of the disk 1 with the center of rotation of the rotatable shaft 10. It may be of any shape if it meets the above condition.

What we claim is:

1. In an apparatus for installing a disk having a through hole formed in the center thereof of the type having a disk support having a supporting surface for supporting one side of the disk; a rotatable shaft having one end fixed to said disk support and having the other end disposed above said support surface; and a disk holder for pressing the disk on its other side toward the supporting surface, thereby causing the disk to be fixed between the disk holder and the disk support, the improvement comprising said disk holder being detachably fitted to the rotatable shaft, and including:

a holder body defining a hole into which said rotatable shaft is inserted to permit movement of said holder body along the rotatable shaft;

pressure means disposed on the holder body to elastically press the disk on its other side against the supporting surface; and slip preventive means for preventing the holder body from slipping off the rotatable shaft by engaging the holder body with the rotatable shaft, said slip preventive means including (i) an engaging groove formed on the outer periphery of said other end of the rotatable shaft;

(ii) at least one engaging lever, one end of which is engageable with said engaging groove and the other end of which protrudes outwardly from the holder body when the disk holder receives the rotatable shaft in its hole and is pushed against the disk disposed on the disk support, said at least one engaging lever being pivotally mounted on the holder body in the middle part thereof so as to be pivotable between a first position wherein said one end thereof is engaged with the engaging groove while the other end thereof protrudes outwardly from the holder body and a second position wherein said one end thereof is disengaged from the engaging groove while the other end thereof is pressed into the holder body; and (iii) biasing means operatively connected to said at least one engaging lever to bias said at least one engaging lever in a direction towards said first position and wherein said holder body defines a cavity, said pressing means including a pressure assembly disposed in said cavity of the holder body to permit movement of said pressure assembly in said cavity, said pressure assembly defining a pressing surface which is pressed against the other side of the disk; and urging means disposed between the holder body and the pressing assembly to urge the pressing surface of the pressure assembly toward the supporting surface.

2. The apparatus according to claim 1, wherein said disk support includes an insertion means provided on the supporting surface at the center thereof to insert the through hole of the disk with the center of the rotatable shaft, for aligning the center of the disk with the center of the rotatable shaft.

3. The apparatus according to claim 2, wherein said insertion means includes a circular-shaped protrusion having a center aligned with the center of the rotatable shaft and having the same diameter with that of the through hole.

4. The apparatus according to claim 3, wherein said disk has at least one transparent base plate having a specified thickness, and the protrusion is substantially equal in thickness with the specified thickness of the transparent base plate.

5. The apparatus according to claim 1, wherein said urging means includes a coil spring which is wound around the outer periphery of the holder body and one end of which is engaged with the holder body and the other end of which is engaged with the pressure assembly.

6. The apparatus according to claim 1 wherein said biasing means includes a coil spring for pressing the other end of the engaging lever outwardly from the holder body.

* * * * *